(12) United States Patent
Chikuni

(10) Patent No.: US 11,379,168 B2
(45) Date of Patent: Jul. 5, 2022

(54) INFORMATION PROCESSING SYSTEM, COMMUNICATION CONNECTION CONTROL METHOD OF INFORMATION PROCESSING DEVICE, AND NON-TRANSITORY COMPUTER-READABLE STORAGE MEDIUM STORING PROGRAM

(71) Applicant: SEIKO EPSON CORPORATION, Tokyo (JP)

(72) Inventor: Yukihiro Chikuni, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/195,085

(22) Filed: Mar. 8, 2021

(65) Prior Publication Data
US 2021/0286568 A1    Sep. 16, 2021

(30) Foreign Application Priority Data
Mar. 10, 2020    (JP) .............................. JP2020-040698

(51) Int. Cl.
*G06F 3/12*    (2006.01)
*H04W 4/80*    (2018.01)
*H04W 76/14*    (2018.01)

(52) U.S. Cl.
CPC .......... *G06F 3/1236* (2013.01); *G06F 3/1209* (2013.01); *G06F 3/1292* (2013.01); *H04W 4/80* (2018.02); *H04W 76/14* (2018.02)

(58) Field of Classification Search
CPC .... G06F 3/1236; G06F 3/1209; G06F 3/1292; H04W 76/14; H04W 4/80

USPC ........................................................ 358/1.15
See application file for complete search history.

(56) References Cited

U.S. PATENT DOCUMENTS

| | | | | |
|---|---|---|---|---|
| 2018/0184485 A1* | 6/2018 | Shibata | ................ | H04W 88/10 |
| 2018/0285035 A1* | 10/2018 | Asakura | ................ | G06F 3/1286 |
| 2019/0265922 A1 | 8/2019 | Ikeda | | |
| 2019/0272127 A1* | 9/2019 | Ruan | .................... | G06F 3/1236 |

FOREIGN PATENT DOCUMENTS

JP    2019-148956 A    9/2019

* cited by examiner

*Primary Examiner* — Allen H Nguyen
(74) *Attorney, Agent, or Firm* — Workman Nydegger

(57) ABSTRACT

A printing system includes a smart device and a printer, and the smart device establishes a communication connection with the printer based on a BLE communication scheme, transmits a first request that requests a process relating to connection confirmation by a user, and establishes a communication connection with the printer based on a Wi-Fi Direct communication scheme when the smart device receives, from the printer, a response to the first request, and the printer performs, based on the first request received, connection confirmation display for prompting a user to perform the connection confirmation, transmits, when receiving a user operation based on the connection confirmation display, a response to the smart device, the response indicating reception of the user operation, and establishes the communication connection with the smart device based on the Wi-Fi Direct communication scheme.

17 Claims, 3 Drawing Sheets

INFORMATION PROCESSING SYSTEM, COMMUNICATION CONNECTION CONTROL METHOD OF INFORMATION PROCESSING DEVICE, AND NON-TRANSITORY COMPUTER-READABLE STORAGE MEDIUM STORING PROGRAM

The present application is based on, and claims priority from JP Application Serial Number 2020-040698, filed Mar. 10, 2020, the disclosure of which is hereby incorporated by reference herein in its entirety.

BACKGROUND

1. Technical Field

The present disclosure relates to an information processing system, a communication connection control method of an information processing device, and a non-transitory computer-readable storage medium storing a program.

2. Related Art

A system including a terminal device and an information processing device which are configured to establish a communication connection with each other based on a plurality of wireless communication schemes is known. JP-A-2019-148956 discloses a communication system including a terminal device configured to determine whether or not a designation electronic apparatus that is a target which performs a job in compliance with a first wireless communication scheme is present, based on a result of wireless communication with the designation electronic apparatus in compliance with a second wireless communication scheme.

When, however, a plurality of designation electronic apparatuses determined in compliance with the second wireless communication scheme are present, the terminal device described in JP-A-2019-148956 may establish a communication connection with a designation electronic apparatus not intended by a user if the user does not clearly identify the designation electronic apparatus.

SUMMARY

According to an aspect of the present disclosure, an information processing system includes: a terminal device; and an information processing device, the terminal device including a terminal wireless communicator configured to perform communication based on a first wireless communication scheme and a second wireless communication scheme, and a terminal controller configured to, by using the terminal wireless communicator, establish a communication connection with the information processing device based on the second wireless communication scheme, transmit a first request to the information processing device with which the communication connection is established based on the second wireless communication scheme, transmit a second request to the information processing device when the terminal device receives a response to the first request from the information processing device, and establish a communication connection with the information processing device based on the first wireless communication scheme, the first request requesting a process relating to connection confirmation to the information processing device by a user, the second request requesting the communication connection based on the first wireless communication scheme in accordance with the response, the information processing device including an information processing device wireless communicator configured to perform communication based on the first wireless communication scheme and the second wireless communication scheme, a display section configured to, when the information processing device wireless communicator receives the first request, perform connection confirmation display which is display for prompting the process relating to the connection confirmation, an operation section configured to receive the process relating to the connection confirmation, and an information processing device controller configured to, when the operation section receives the process relating to the connection confirmation, transmit the response indicating reception of the process relating to the connection confirmation by the information processing device wireless communicator to the terminal device, the information processing device controller being configured to, when the second request is received by the information processing device wireless communicator from the terminal device, establish the communication connection with the terminal device based on the first wireless communication scheme.

Another aspect of the present disclosure is a communication connection control method of an information processing device, the communication connection control method including: establishing a communication connection with a terminal device based on a second wireless communication scheme; performing connection confirmation display when the information processing device receives a first request from the terminal device with which the communication connection based on the second wireless communication scheme is established, the first request requesting a process relating to connection confirmation by a user, the connection confirmation display being display for prompting the process relating to the connection confirmation; transmitting a response to the terminal device in response to the first request when the information processing device receives the process relating to the connection confirmation from the user, the response indicating reception of the process relating to the connection confirmation; receiving a second request from the terminal device in accordance with the response thus transmitted, the second request requesting a communication connection based on a first wireless communication scheme; and establishing, based on the second request thus received, the communication connection with the terminal device based on the first wireless communication scheme.

Still another aspect of the present disclosure is a communication connection control method of a terminal device, the communication connection control method including: establishing a communication connection with an information processing device based on a second wireless communication scheme; transmitting a first request to the information processing device with which the communication connection based on the second wireless communication scheme is established, the first request requesting a process relating to connection confirmation by a user; receiving a response to the first request, the response indicating reception of the process relating to the connection confirmation to the information processing device; transmitting a second request to the information processing device in accordance with the response thus received, the second request requesting a communication connection based on a first wireless communication scheme; and establishing the communication connection with the information processing device based on the first wireless communication scheme.

Yet another aspect of the present disclosure is a non-transitory computer-readable storage medium storing a program executable by a terminal controller of a terminal device, the program causing the terminal controller to: establish a communication connection with an information processing device based on a second wireless communication scheme; transmit a first request to the information processing device with which the communication connection based on the second wireless communication scheme is established, the first request requesting a process relating to connection confirmation by a user; receive a response to the first request, the response indicating reception of the process relating to the connection confirmation to the information processing device; transmit a second request to the information processing device in accordance with the response thus received, the second request requesting a communication connection based on a first wireless communication scheme; and establish the communication connection with the information processing device based on the first wireless communication scheme.

DESCRIPTION OF EXEMPLARY EMBODIMENTS

Figure 1:
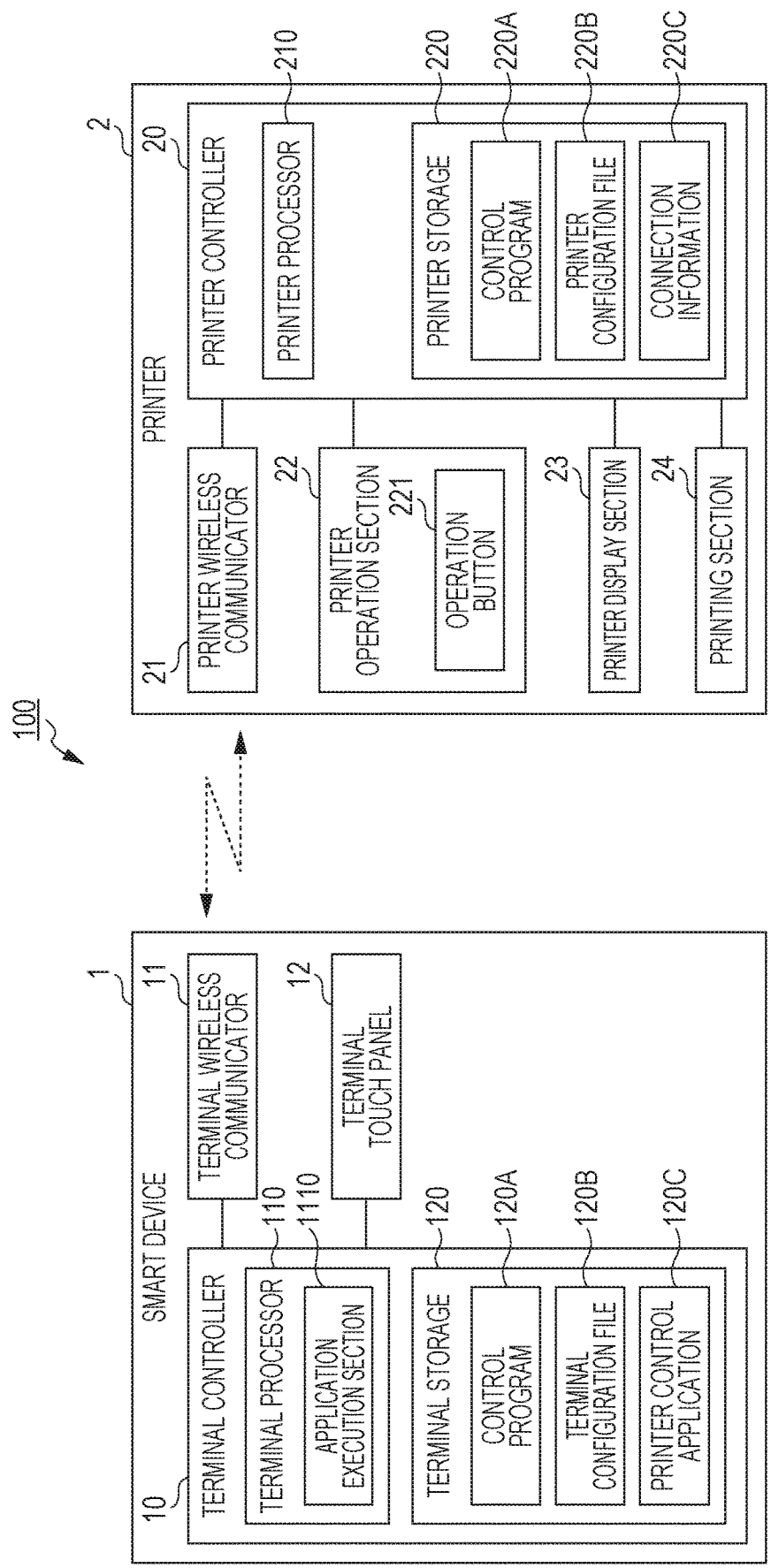
FIG. 1 is a view illustrating a functional configuration of a smart device and a printer.

FIG. 1 is a block diagram illustrating a functional configuration of a smart device 1 and a printer 2 which are included in a printing system 100. The printing system 100 corresponds to an example of an information processing system. The smart device 1 corresponds to an example of a terminal device. The printer 2 corresponds to an example of an information processing device.

The smart device 1 is a terminal device portable by a user and is a smartphone, a tablet computer, or the like.

The printer 2 is a device that prints characters and/or images onto a print medium. The printer 2 exemplifies a serial ink jet printer that performs printing with a serial type ink jet head.

In the printing system 100, a communication connection between the smart device 1 and the printer 2 is possible based on a communication scheme in conformity with the Bluetooth Low Energy (BLE) standard and a communication scheme in conformity with the Wi-Fi Direct standard. Bluetooth is a registered trademark. Wi-Fi is a registered trademark. In the following description, the communication scheme in conformity with the BLE standard is referred to as a "BLE communication scheme", and the communication scheme in conformity with the Wi-Fi Direct standard is referred to as a "Wi-Fi Direct communication scheme". The BLE communication scheme corresponds to an example of a second wireless communication scheme, and the Wi-Fi Direct communication scheme corresponds to a first wireless communication scheme. When the printer 2 establishes a communication connection with the smart device 1 based on the Wi-Fi Direct communication scheme, the printer 2 shifts a communication mode to a simple Access Point (AP) mode. The simple AP mode is a communication mode in which the printer 2 functions as an access point. In the simple AP mode, the smart device 1 is connected to a wireless network established by the printer 2, and thereby, wireless communication with the printer 2 is possible without depending on a network environment.

Function blocks of the terminal controller 1 will be described. The smart device 1 includes a terminal controller 10, a terminal wireless communicator 11, and a terminal touch panel 12.

The terminal controller 10 includes: a terminal processor 110 which is a processor, such as a CPU or an MPU, configured to execute a program; and a terminal storage 120. The terminal controller 10 controls components of the smart device 1. In the terminal controller 10, the terminal processor 110 reads a terminal control program 120A stored in a terminal storage 120 so as to execute a process and executes various processes by hardware and software.

In the smart device 1, an application that controls the printer 2 is installed in advance. The application is referred to as a "printer control application" and is denoted by 120C. The printer control application 120C corresponds to an example of a program.

The printer control application 120C is read from terminal storage 120 and is executed by the terminal processor 110, and the printer control application 120C causes the terminal controller 10 to function as an application execution section 1110.

The terminal storage 120 stores the program to be executed by the terminal processor 110 and data to be processed by the terminal processor 110. The terminal storage 120 stores the control program 120A to be executed by the terminal processor 110, a terminal configuration file 120B, the printer control application 120C, and various other data. The terminal configuration file 120B stores combinations of configuration items relating to the smart device 1 and respective set values corresponding to the configuration items. The terminal storage 120 includes a nonvolatile storage area which non-volatilely stores programs and data. The terminal storage 120 may include a volatile storage area to configure a work area which temporarily stores the program to be executed by the terminal processor 110 and data to be processed.

The terminal wireless communicator 11 includes communication hardware in conformity with the BLE standard and communication hardware in conformity with the Wi-Fi Direct standard and is controlled by the terminal controller 10 to perform wireless communication with the printer 2 based on the BLE communication scheme or the Wi-Fi Direct communication scheme.

The terminal touch panel 12 is a touch panel including a display panel such as a liquid crystal display panel and a touch sensor provided to be superimposed on or integrally with the display panel. The display panel is controlled by the terminal controller 10 to display various images. The touch sensor detects a touch operation and outputs the touch operation to the terminal controller 10. The terminal controller 10 executes, based on an input from the touch sensor, a process corresponding to the touch operation given to the terminal touch panel 12.

Next, function blocks of the printer 2 will be described. The printer 2 includes a printer controller 20, a printer wireless communicator 21, a printer operation section 22, a printer display section 23, and a printing section 24. The printer controller 20 corresponds to an example of an information processing device controller. The printer wireless communicator 21 corresponds to an example of an information processing device wireless communicator. The printer operation section 22 corresponds to an example of an operation section. The printer display section 23 corresponds to an example of a display section.

The printer controller 20 includes: a printer processor 210 which is a processor, such as a CPU or an MPU, configured to execute a program; and a printer storage 220. The printer controller 20 controls components of the printer 2. The printer processor 210 reads a control program 220A stored in the printer storage 220 and processes the control program 220A, and the printer processor 210 executes various processes by hardware and software.

The printer storage 220 stores a program to be executed by the printer processor 210 and data to be processed by the printer processor 210. The printer storage 220 stores the control program 220A to be executed by the printer processor 210, a printer configuration file 220B, connection information 220C, and various other data. The printer configuration file 220B stores combinations of configuration items relating to the printer 2 and respective set values corresponding to the configuration items. The connection information 220C includes: the Service Set Identifier (SSID) of a wireless network established by the printer 2 when the communication mode of the printer 2 is the simple AP mode; and a password for connection to the wireless network. The printer storage 220 includes a nonvolatile storage area which non-volatilely stores programs and data. The printer storage 220 may include a volatile storage area to configure a work area for temporarily storing a program to be executed by the printer processor 210 and data to be processed.

The printer wireless communicator 21 includes communication hardware in conformity with the BLE standard and communication hardware in conformity with the Wi-Fi Direct standard and is controlled by the printer controller 20 to perform wireless communication with the smart device 1 based on the BLE communication scheme or the Wi-Fi Direct communication scheme.

The printer operation section 22 includes a plurality of operation buttons 221 provided to the printer 2, detects an operation given to an operation unit by a user, and outputs a detection result to the printer controller 20. The printer operation section 22 may include a touch panel additionally, or alternatively, to the operation buttons 221. The printer controller 20 executes, based on an input from the printer operation section 22, a process corresponding to the operation given to the operation unit. One operation of operations given to the operation unit by a user corresponds to a process relating to connection confirmation by the user. A long-press operation, a prescribed number of times of press down operation, or the like of a prescribed operation button 221 of the plurality of operation buttons 221 is assigned to the process relating to the connection confirmation. The prescribed operation button 221 may be assigned to a reset button. When including the touch panel alternatively to the operation buttons 221, the printer operation section 22 may cause the touch panel to display a confirmation button and may cause user's touching the confirmation button to correspond to the process relating to the connection confirmation.

The printer display section 23 includes a plurality of LEDs, a display panel, and the like and executes turning on/turning off/flickering of the LEDs in a prescribed manner, display of information on the display panel, and the like under control by the printer controller 20. When the printer operation section 22 includes the touch panel, the display panel included in the printer display section 23 may cause the touch panel to function as a display panel. In the case of an LED, display of the LED flickering at a prescribed time interval may be assigned to display for prompting the process relating to the connection confirmation, or when a plurality of LEDs are provided, one LED of the plurality of LEDs may be turned on. When the touch panel is caused to function as the display panel, an operation method of the process relating to the connection confirmation may be displayed.

The printing section 24 includes components such as an ink jet head which ejects ink to form dots on a print medium, a carriage which operates the ink jet head in a scan direction, a carriage drive motor which drives the carriage, a transport unit which transports the print medium, and an ink supply unit which supplies ink to the ink jet head. The printing section 24 ejects, in accordance with control by the printer controller 20, ink through a nozzle of the ink jet head to form dots on a print surface of the print medium transported, thereby performing printing on the print medium.

When in the printing system 100, the smart device 1 controls the printer 2 by the function of the printer control application 120C, the smart device 1 and the printer 2 wirelessly communicate with each other based on the Wi-Fi Direct communication scheme. This is because the Wi-Fi Direct communication scheme is faster in communication speed and wider in coverage than the BLE communication scheme. In the printing system 100, the smart device 1 and the printer 2 operate as described below to establish the communication connection therebetween based on the Wi-Fi Direct communication scheme.

Figure 2A:
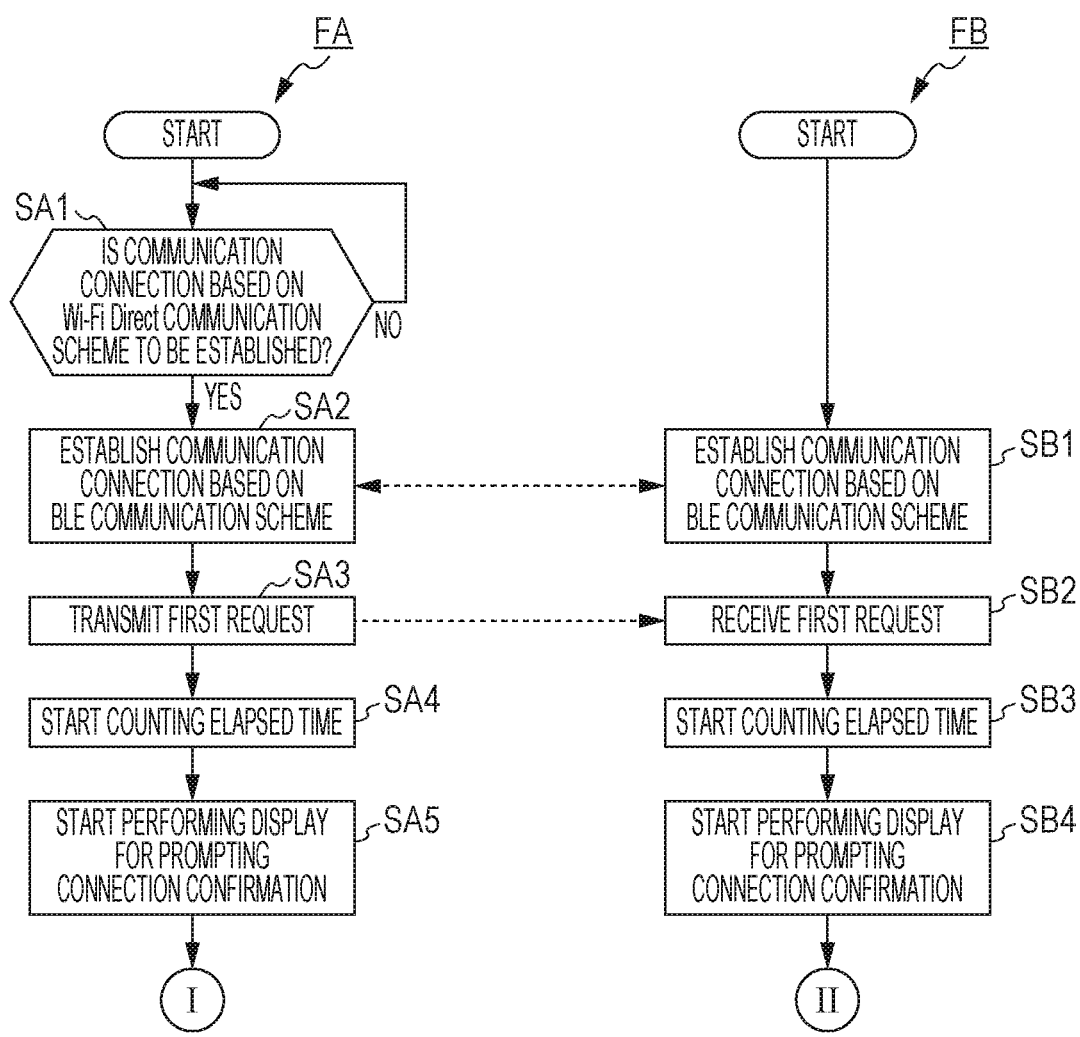
FIG. 2A is a flowchart illustrating operation of the smart device and the printer.
Figure 2B:
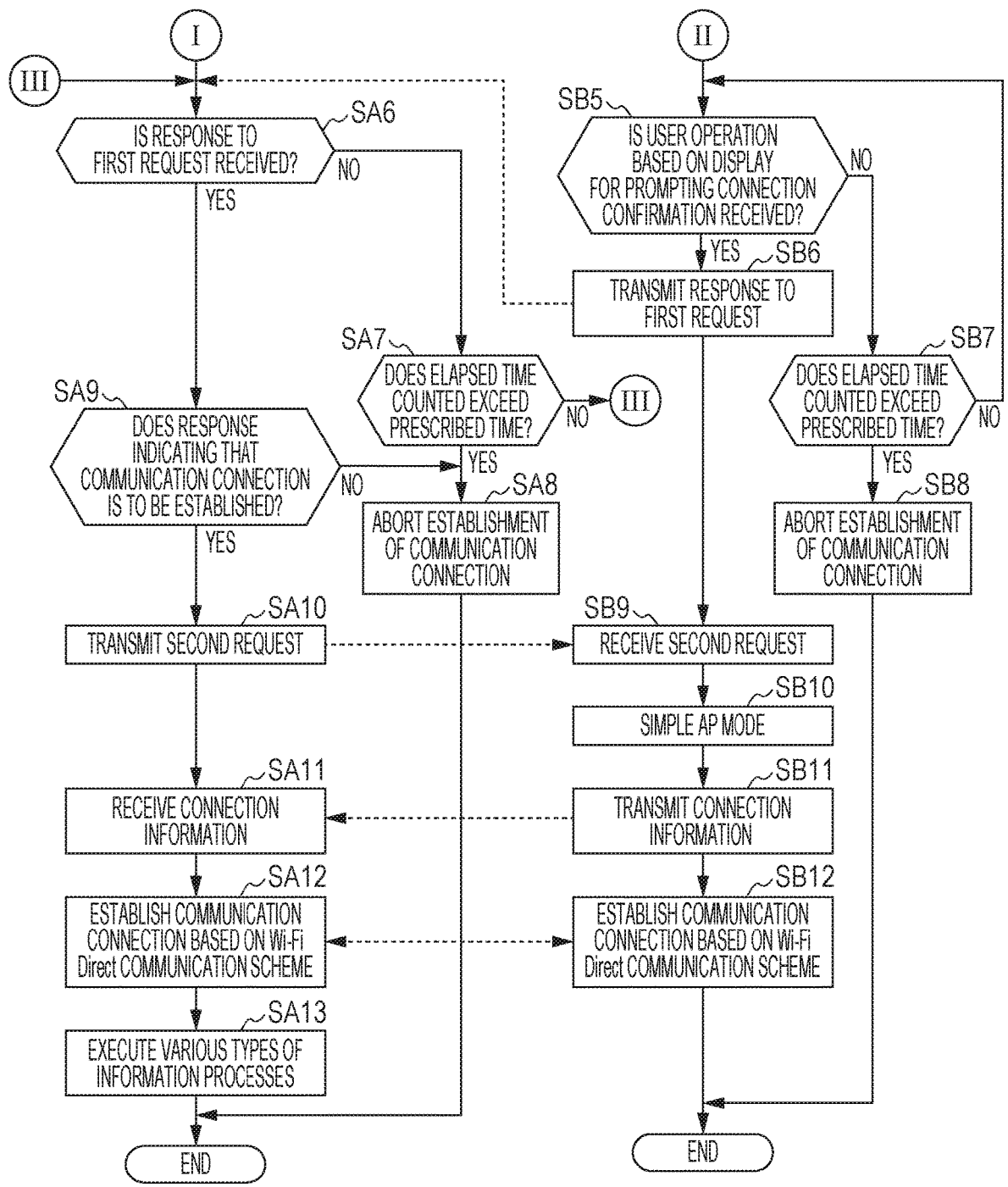
FIG. 2B is a flowchart illustrating the operation of the smart device and the printer.

FIGS. 2A and 2B are each a flowchart illustrating the operation of the smart device 1 and the printer 2. In FIGS. 2A and 2B, a flowchart FA shows the operation of the smart device 1, and a flowchart FB shows the operation of the printer 2.

In FIG. 2A, a user starts the printer control application 120C, and the terminal controller 10 functions as the application execution section 1110. At an operation start time point in FIG. 2A, the printer 2 transmits a beacon signal according to the BLE standard.

The application execution section 1110 of the smart device 1 determines whether or not a communication connection with the printer 2 based on the Wi-Fi Direct communication scheme is to be established (step SA1).

When an operation detected by the printer operation section 22 is an operation of instructing establishment of the communication connection based on the Wi-Fi Direct communication scheme, the application execution section 1110 makes a positive determination in step SA1.

When the application execution section 1110 determines that the communication connection based on the Wi-Fi Direct communication scheme is to be established (step SA1: YES), the terminal wireless communicator 11 establishes a communication connection with the printer 2 based on the BLE communication scheme (step SA2).

As illustrated in the flowchart FB, the printer controller 20 of the printer 2 establishes, along with the establishment of the communication connection of the smart device 1, a communication connection with the smart device 1 based on the BLE communication scheme by the printer wireless communicator 21 (step SB1).

As illustrated in the flowchart FA, after the application execution section 1110 establishes the communication connection with the printer 2 based on the BLE communication scheme, the terminal wireless communicator 11 transmits, to the printer 2, a first request that requests the process relating to the connection confirmation by a user (step SA3).

After transmitting the first request to the printer 2, the application execution section 1110 starts counting a time elapsed after the transmission of the first request (step SA4).

This step may be omitted when a time out error is not set in advance, and the process may proceed to a next step.

Then, the application execution section 1110 starts performing, by the terminal touch panel 12, display for prompting the connection confirmation by the printer 2 (step SA5).

In step SA5, the application execution section 1110 starts performing display for prompting confirmation of the printer 2 with which the communication connection based on the Wi-Fi Direct communication scheme is to be established.

As illustrated in flowchart FB, after receiving the first request by the printer wireless communicator 21 (step SB2), the printer controller 20 starts counting an elapsed time after the reception of the first request (step SB3). The elapsed time is counted when the time out error is set in advance. When the time out error is not set, the step of performing the counting may be omitted.

Next, the printer controller 20 starts connection confirmation display which is display for prompting a user to perform the connection confirmation by the printer display section 23 (step SB4).

In step SB4, the printer controller 20 starts performing display for prompting confirmation of whether or not the printer 2 is set as a printer 2 which is to establish the communication connection with the smart device 1 based on the Wi-Fi Direct communication scheme.

Then, the printer controller 20 determines, based on a sensing result by the printer operation section 22, whether or not the printer operation section 22 receives a user operation (step SB5). The user operation given to the printer operation section 22 corresponds to the process relating to the connection confirmation.

When the printer operation section 22 receives a user operation of confirming that the printer 2 is set as the printer 2 which is to establish the communication connection based on the Wi-Fi Direct communication scheme or a user operation of confirming that the printer 2 is not the printer 2 which is to establish the communication connection based on the Wi-Fi Direct communication scheme, the printer controller 20 performs a positive determination in step SB5. That is, reception of the process relating to the connection confirmation is shown.

When determining that the printer operation section 22 receives the user operation (step SB5: YES), the printer controller 20 transmits, to the smart device 1, a response to the first request by the printer wireless communicator 21 (step SB6). The response transmitted in step SB6 includes information representing the user operation thus received.

When the printer controller 20 determines that the printer operation section 22 does not receive the user operation based on the connection confirmation display (step SB5: NO), the printer controller 20 determines whether or not the elapsed time started to be counted in step SB4 exceeds a predetermined time (step SB7).

When the printer controller 20 determines that the elapsed time started to be counted in step SB4 does not exceed the predetermined time (step SB7: NO), the process returns to step SB5.

When the printer controller 20 determines that the elapsed time started to be counted in step SB4 exceeds the predetermined time (step SB7: YES), the printer controller 20 aborts establishment of the communication connection based on the Wi-Fi Direct communication scheme (step SB8). Step SB7 and step SB8 are performed as necessary.

As illustrated in the flowchart FA, the application execution section 1110 determines, by the terminal wireless communicator 11, whether or not the smart device 1 receives the response to the first request after the terminal touch panel 12 starts performing the display for prompting the connection confirmation by the printer 2 (step SA6).

When the terminal wireless communicator 11 determines that the smart device 1 does not receive the response to the first request (step SA6: NO), the application execution section 1110 determines whether or not the elapsed time started to be counted in step SA4 exceeds the predetermined time (step SA7).

When the application execution section 1110 determines that the elapsed time started to be counted in step SA4 does not exceed the predetermined time (step SA7: NO), the process returns to step SA6.

When the application execution section 1110 determines that the elapsed time started to be counted in step SA4 exceeds the predetermined time (step SA7: YES), the printer controller 20 aborts establishment of the communication connection based on the Wi-Fi Direct communication scheme (step SA8).

Returning to the description of step SA6, when the application execution section 1110 determines that the terminal wireless communicator 11 receives the response to the first request (step SA6: YES), the application execution section 1110 determines whether or not the response to the first request is a response indicating that the communication connection based on the Wi-Fi Direct communication scheme is to be established (step SA9).

In step SA9, the response to the first request is assumed to include information representing a user operation of confirming that the printer 2 is the printer 2 which is to establish the communication connection based on the Wi-Fi Direct communication scheme. In this case, the application execution section 1110 makes a positive determination in step SA9. In step SA9, the response to the first request is assumed to include information representing a user operation of confirming that the printer 2 is not the printer 2 which is to establish the communication connection based on the Wi-Fi Direct communication scheme. In this case, the application execution section 1110 makes a negative determination in step SA9.

When the application execution section 1110 determines that the response is not the response indicating that the communication connection based on the Wi-Fi Direct communication scheme is to be established (step SA9: NO), the process proceeds to step SA8 to abort establishment of the communication connection based on the Wi-Fi Direct communication scheme.

When the application execution section 1110 determines that the response is the response indicating that the communication connection based on the Wi-Fi Direct communication scheme is to be established (step SA9: YES), the terminal wireless communicator 11 transmits, to the printer 2, a second request that requests establishment of the communication connection based on the Wi-Fi Direct communication scheme (step SA10).

As illustrated in the flowchart FB, after receiving the second request (step SB9), the printer controller 20 changes the communication mode to the simple AP mode (step SB10) and transmits the connection information 220C stored in the printer storage 220 to the smart device 1 (step SB11).

As illustrated in the flowchart FA, after receiving the connection information 220C from the printer 2 step SA11), the application execution section 1110 establishes the communication connection with the printer 2 based on the Wi-Fi Direct communication scheme (step SA12).

In step SA12, the application execution section 1110 sets, in the terminal configuration file 120B, SSID and a password included in the connection information 220C thus received and establishes the communication connection with the printer 2 based on the Wi-Fi Direct communication scheme. A configuration item relating to the smart device 1 and stored in the terminal configuration file 120B includes a configuration item relating to the SSID and a configuration item relating to the password in connection with a wireless communication configuration. In step SA12, the application execution section 1110 sets, in the configuration item relating to the SSID, a set value representing the SSID included in the connection information 220C thus received and sets, in the configuration item relating to the password, a set value representing the password included in the connection information 220C thus received. Thus, the application execution section 1110 establishes the communication connection with the printer 2 based on the Wi-Fi Direct communication scheme.

As illustrated in the flowchart FB, when the communication connection of the smart device 1 is established, the printer controller 20 establishes the communication connection with the smart device 1 based on the Wi-Fi Direct communication scheme by the printer wireless communicator 21 (step SB12).

As illustrated in the flowchart FA, after the application execution section 1110 establishes the communication connection with the printer 2 based on the Wi-Fi Direct communication scheme, the application execution section 1110 executes various types of information processes with respect to the printer 2 (step SA13).

In step SA13, the application execution section 1110 executes various configuration processes with respect to the printer 2. The application execution section 1110 transmits print data to the printer 2 and causes the printer 2 to execute printing.

As described above, in the printing system 100, the communication connection between the smart device 1 and the printer 2 is possible based on the Wi-Fi Direct communication scheme. The smart device 1 includes the terminal wireless communicator 11 configured to perform communication based on the Wi-Fi Direct communication scheme and the BLE communication scheme. The smart device 1 includes the terminal controller configured to establish a communication connection with the printer 2 based on the BLE communication scheme and transmit the first request which requests the process relating to the connection confirmation by a user to the printer 2 with which the communication connection based on the BLE communication scheme is established by the terminal wireless communicator 11. When the terminal wireless communicator 11 receives the response to the first request from the printer 2, the terminal controller transmits, to the printer 2, the second request which requests the communication connection based on the Wi-Fi Direct communication scheme in accordance with the response thus received, and the terminal controller establishes the communication connection with the printer 2 based on the Wi-Fi Direct communication scheme. The printer 2 includes: the printer wireless communicator 21 configured to perform communication based on the Wi-Fi Direct communication scheme and the BLE communication scheme; the printer display section 23 configured to perform the connection confirmation display which is display that prompts the user to perform the connection confirmation when the printer wireless communicator 21 receives the first request; and the printer operation section 22 configured to receive a user operation based on the connection confirmation display performed by the printer display section 23. The printer 2 further includes the printer controller 20. The printer controller 20 is configured to, when the printer operation section 22 receives the user operation, transmit, to the smart device 1 by the printer wireless communicator 21, a response indicating the user operation thus received in response to the first request. The printer controller 20 is configured to, when the second request is received by the printer wireless communicator 21 from the smart device 1, establishes the communication connection with the smart device 1 based on the Wi-Fi Direct communication scheme.

With this configuration, the communication connection based on the Wi-Fi Direct communication scheme is established based on the response indicating the user operation received by the printer 2, which enables the smart device 1 to establish the communication connection with the printer 2 desired by the user based on the Wi-Fi Direct communication scheme.

When a plurality of printers 2 each having the same communication scheme as the smart device 1 are present within a predetermined range in which communication based on the BLE communication scheme is possible, the smart device 1 regards all the printers 2 as candidates with which the communication connection based on the Wi-Fi Direct communication scheme is to be established. However, the smart device 1 is configured to establish the communication connection with a printer 2 desired by the user based on the Wi-Fi Direct communication scheme as described above. When a plurality of printers 2 each having the same communication function as the smart device 1 are present within the predetermined range, the smart device 1 establishes the communication connection with the printer 2 desired by the user based on the Wi-Fi Direct communication scheme.

Since the communication connection based on the Wi-Fi Direct communication scheme is established, a communication environment with a fast communication speed and wide coverage is established between the smart device 1 and the printer 2 as compared to a case where the communication connection is established based on the BLE communication scheme.

The terminal controller 10 may determine whether or not the response to the first request is received by the terminal wireless communicator 11 within a predetermined time after the transmission of the first request.

With this configuration, the terminal controller 10 performs this determination, which enables a process to be executed according to whether or not the reception of the response to the first request times out.

When the terminal controller 10 determines that the terminal wireless communicator 11 fails to receive the response to the first request within the predetermined time, the terminal controller 10 may abort establishment of the communication connection with the printer 2 based on the Wi-Fi Direct communication scheme.

With this configuration, the terminal controller 10 aborts establishment of the communication connection with the printer 2 based on the Wi-Fi Direct communication scheme when the reception of the response to the first request times out, which enables prevention of long-term execution of an establishing process of the communication connection based on the Wi-Fi Direct communication scheme.

The printer operation section 22 may be a touch panel having a function as the operation button 221 or the printer display section 23.

With this configuration, the response to the first request is transmitted when a user gives a manual operation to the printer 2, and therefore, the smart device 1 reliably establishes the communication connection with the printer 2 based on the Wi-Fi Direct communication scheme.

The communication connection control method of the printer 2 includes establishing the communication connection with the smart device 1 based on the BLE communication scheme. The communication connection control method of the printer 2 includes performing the connection confirmation display when the printer 2 receives the first request from the smart device 1 with which the communication connection based on the BLE communication scheme is established, the first request requesting the process relating to the connection confirmation by a user, the connection confirmation display being display for prompting the user to perform the connection confirmation. The communication connection control method of the printer 2 includes transmitting a response to the smart device 1 in response to the first request when the printer 2 receives a user operation based on the connection confirmation display, the response indicating reception of the user operation. The communication connection control method of the printer 2 includes: receiving, from the smart device 1, the second request from the smart device 1 in accordance with the response, the second request requesting the communication connection based on the Wi-Fi Direct communication scheme; and establishing, based on the second request thus received, the communication connection with the smart device 1 based on the Wi-Fi Direct communication scheme.

With this configuration, the communication connection with the smart device 1 based on the Wi-Fi Direct communication scheme is established by transmitting, to the smart device 1, a response indicating the user operation given to the printer 2, which enables the smart device 1 to establish the communication connection with the printer 2 desired by the user based on the Wi-Fi Direct communication scheme.

The communication connection control method of the smart device 1 includes establishing the communication connection with the printer 2 based on the BLE communication scheme. The communication connection control method of the smart device 1 includes transmitting the first request which requests the process relating to the connection confirmation by a user to the printer 2 with which the communication connection based on the BLE communication scheme is established. The communication connection control method of the smart device 1 includes receiving a response which is a response to the first request and which represents reception of the user operation given to the printer 2. The communication connection control method of the smart device 1 includes: transmitting, to the printer 2, the second request which requests the communication connection based on the Wi-Fi Direct communication scheme in accordance with the response thus received; and establishing the communication connection with the printer 2 based on the Wi-Fi Direct communication scheme.

The printer control application 120C executable by the terminal controller 10 of the smart device 1 causes the terminal controller 10 to establish the communication connection with the printer 2 based on the BLE communication scheme. The printer control application 120C causes the terminal controller 10 to transmit the first request which requests the process relating to the connection confirmation by a user to the printer 2 with which the communication connection based on the BLE communication scheme is established. The printer control application 120C causes the terminal controller 10 to receive a response which is a response to the first request and which represents the user operation given to the printer 2. The printer control application 120C causes the terminal controller 10 to: transmit the second request to the printer 2 in accordance with the response thus received, the second request requesting the communication connection based on the Wi-Fi Direct communication scheme; and establish the communication connection with the printer 2 based on the Wi-Fi Direct communication scheme.

According to the communication connection control method of the smart device 1 and the printer control application 120C, the communication connection based on the Wi-Fi Direct communication scheme is established based on the response indicating the user operation given to the printer 2, which enables the smart device 1 to establish the communication connection with the printer 2 desired by the user based on the Wi-Fi Direct communication scheme.

The communication connection control method of the smart device 1 may include aborting establishment of the communication connection with the printer 2 based on the Wi-Fi Direct communication scheme when the smart device 1 fails to receive the response to the first request within the predetermined time after the transmission of the first request.

With this configuration, the terminal controller 10 aborts establishment of the communication connection with the printer 2 based on the Wi-Fi Direct communication scheme when the reception of the response to the first request times out, which enables prevention of long-term execution of an establishing process of the communication connection based on the Wi-Fi Direct communication scheme.

The above-described embodiment is merely an aspect of the present disclosure and may accordingly be modified and applied within the scope of the present disclosure.

The terminal device may be in a desktop form or a laptop form.

In the above-described embodiment, the BLE communication scheme is shown as an example of the first wireless communication scheme. However, the first wireless communication scheme is not limited to the BLE communication scheme but may be a communication scheme compliant with a Bluetooth standard other than the BLE standard or a communication scheme compliant with a near-field communication standard other than the Bluetooth standard. In the embodiment, the Wi-Fi Direct communication scheme is described as an example of the second wireless communication scheme, but the second wireless communication scheme may be other wireless communication scheme. However, the second wireless communication scheme may be a wireless communication scheme having a faster communication speed and wider coverage than the first wireless communication scheme.

In the embodiment, the printer 2 is described as an example of the serial ink jet printer, but the printer 2 may be a line ink jet printer having a line-type print head. The print method of the printer 2 is not limited to the ink jet type but may be another print method such as a thermal type.

In the embodiment, the printer 2 is described as an example of the information processing device, but the information processing device may be another printing apparatus such as a multi-function device having a print function and a scan function. The information processing device is not limited to the printing apparatus and may be another apparatus such as a scanner or a projector.

Functions of the terminal controller 10 and the printer controller 20 may be implemented by a plurality of processors or semiconductor chips.

Each component shown in FIG. 1 is not particularly limited. Hardware components corresponding to respective components do not necessarily have to be mounted, but it is also possible to configure such that one processor executes a program, thereby implementing respective functions of the components. In the embodiment, some of functions implemented by software may be implemented as hardware, or some of the functions implemented by hardware may be implemented by software. Detailed configurations of other components than the smart device 1 and the printer 2 may also accordingly be modified without departing from the spirit of the present disclosure.

Step units of the operation shown in FIGS. 2A and 2B are obtained by division in accordance with main process contents for ease of understanding of operation of each component in the printing system 100 and are not limited by a method for the division and the names of processing units. In accordance with the process contents, step units may be divided into a larger number of step units. One step unit may be divided to include further increased number of processes. The order of the steps may accordingly be changed without departing from the scope of the disclosure.

What is claimed is:

1. An information processing system comprising:
    a terminal device; and
    an information processing device,
    the terminal device including
        a terminal wireless communicator configured to perform communication based on a first wireless communication scheme and a second wireless communication scheme, and
        a terminal controller configured to, by using the terminal wireless communicator,
            establish a communication connection with the information processing device based on the second wireless communication scheme,
            transmit a first request to the information processing device with which the communication connection is established based on the second wireless communication scheme,
            transmit a second request to the information processing device when the terminal device receives a response to the first request from the information processing device, and
            establish a communication connection with the information processing device based on the first wireless communication scheme, the first request requesting a process relating to connection confirmation to the information processing device by a user, the second request requesting the communication connection based on the first wireless communication scheme in accordance with the response,
    the information processing device including
        an information processing device wireless communicator configured to perform communication based on the first wireless communication scheme and the second wireless communication scheme,
        a display section configured to, when the information processing device wireless communicator receives the first request, perform connection confirmation display which is display for prompting the process relating to the connection confirmation,
        an operation section configured to receive the process relating to the connection confirmation, and
        an information processing device controller configured to, when the operation section receives the process relating to the connection confirmation, transmit the response indicating reception of the process relating to the connection confirmation by the information processing device wireless communicator to the terminal device, the information processing device controller being configured to, when the second request is received by the information processing device wireless communicator from the terminal device, establish the communication connection with the terminal device based on the first wireless communication scheme.

2. The information processing system of claim 1, wherein the terminal controller is configured to determine whether or not the terminal wireless communicator receives the response within a predetermined time after the first request is transmitted.

3. The information processing system of claim 2, wherein when the terminal controller determines that the terminal wireless communicator fails to receive the response within the predetermined time, the terminal controller aborts establishment of the communication connection with information processing device based on the first wireless communication scheme.

4. The information processing system according to claim 1, wherein
    the operation section is a touch panel having a function as an operation button or the display section.

5. The information processing system of claim 1, wherein the second wireless communication scheme is a Bluetooth Low Energy communication scheme.

6. The information processing system of claim 5, wherein the first wireless communication scheme is a Wi-Fi Direct communication scheme.

7. A communication connection control method of an information processing device, the communication connection control method comprising:
    establishing a communication connection with a terminal device based on a second wireless communication scheme;
    performing connection confirmation display when the information processing device receives a first request from the terminal device with which the communication connection based on the second wireless communication scheme is established, the first request requesting a process relating to connection confirmation by a user, the connection confirmation display being display for prompting the process relating to the connection confirmation;
    transmitting a response to the terminal device in response to the first request when the information processing device receives the process relating to the connection confirmation from the user, the response indicating reception of the process relating to the connection confirmation;
    receiving a second request from the terminal device in accordance with the response thus transmitted, the second request requesting a communication connection based on a first wireless communication scheme; and
    establishing, based on the second request thus received, the communication connection with the terminal device based on the first wireless communication scheme.

8. The communication connection control method of claim 7, further comprising
    determining whether or not the information processing device receives the process relating to the connection confirmation from the user within a predetermined time after reception of the first request.

9. The communication connection control method of claim 8, further comprising aborting establishment of the communication connection with the information processing device based on the first wireless communication scheme when it is determined that the information processing device fails to receive the process relating to the connection confirmation from the user within the predetermined time.

10. The communication connection control method according to claim 7, wherein
the second wireless communication scheme is a Bluetooth Low Energy communication scheme.

11. The communication connection control method of claim 10, wherein
the first wireless communication scheme is a Wi-Fi Direct communication scheme.

12. A non-transitory computer-readable storage medium storing a program executable by a terminal controller of a terminal device, the program causing the terminal controller to:
establish a communication connection with an information processing device based on a second wireless communication scheme;
transmit a first request to the information processing device with which the communication connection based on the second wireless communication scheme is established, the first request requesting a process relating to connection confirmation by a user;
receive a response to the first request, the response indicating reception of the process relating to the connection confirmation to the information processing device;
transmit a second request to the information processing device in accordance with the response thus received, the second request requesting a communication connection based on a first wireless communication scheme; and
establish the communication connection with the information processing device based on the first wireless communication scheme.

13. The non-transitory computer-readable storage medium of claim 12, wherein
the program causes the terminal controller to determine whether or not the terminal controller receives the response within a predetermined time after the first request is transmitted.

14. The non-transitory computer-readable storage medium of claim 13, wherein
the program causes the terminal controller to abort establishment of the communication connection with information processing device based on the first wireless communication scheme when the terminal controller determines that the terminal controller fails to receive the response within the predetermined time.

15. The non-transitory computer-readable storage medium of claim 12, wherein
the program causes the terminal controller to execute display for prompting the connection confirmation on a touch panel having a function as the operation button or the display section.

16. The non-transitory computer-readable storage medium of claim 12, wherein
the second wireless communication scheme is a Bluetooth Low Energy communication scheme.

17. The non-transitory computer-readable storage medium of claim 16, wherein
the first wireless communication scheme is a Wi-Fi Direct communication scheme.

* * * * *